Dec. 2, 1958
E. H. BRINK
2,862,541
METHOD OF AND APPARATUS FOR MAKING FIBER
REINFORCED PLASTIC PIPE
Filed April 19, 1954
4 Sheets-Sheet 1
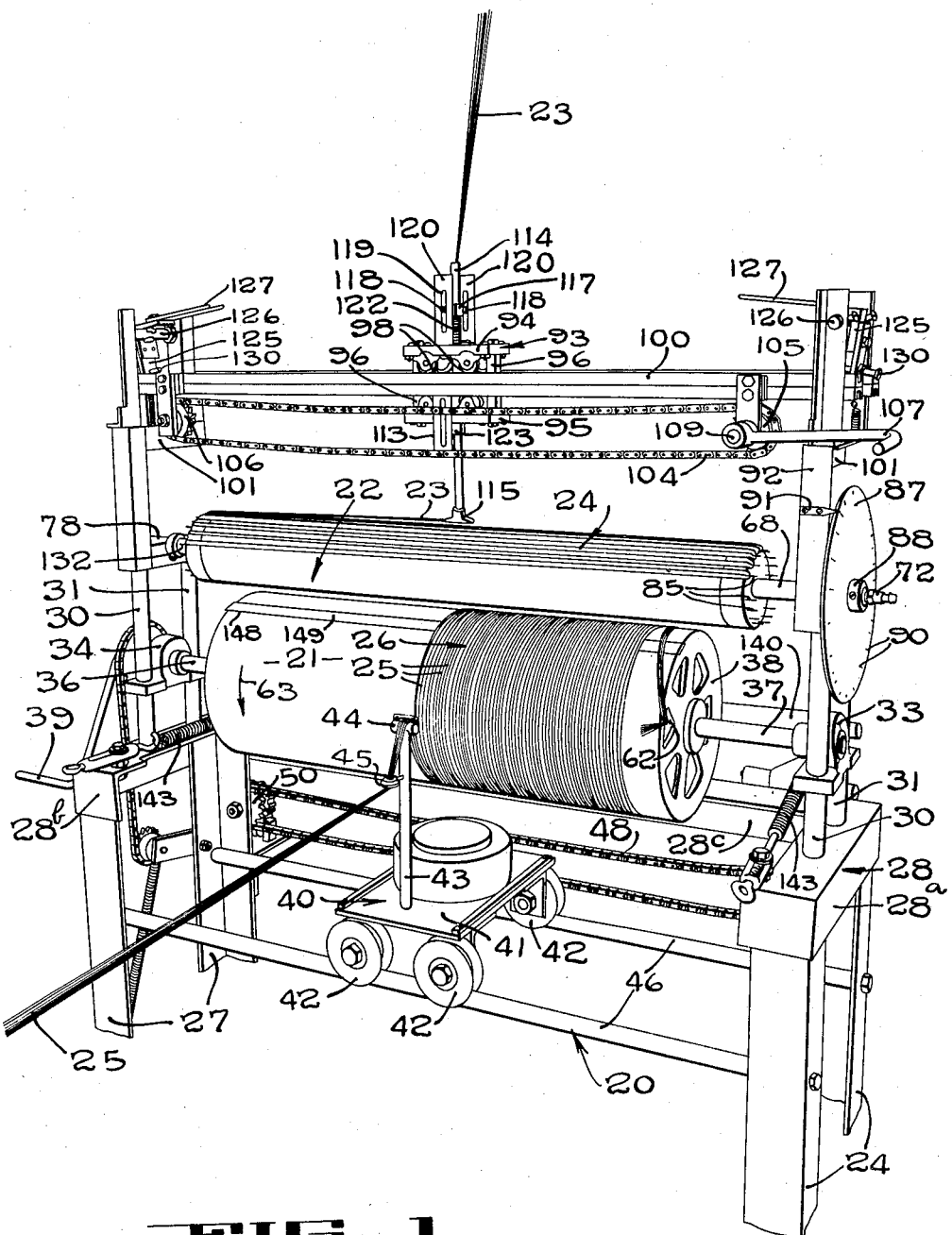
FIG_1
INVENTOR
EDWIN H. BRINK
BY Hans G. Hoffmeister.
ATTORNEY

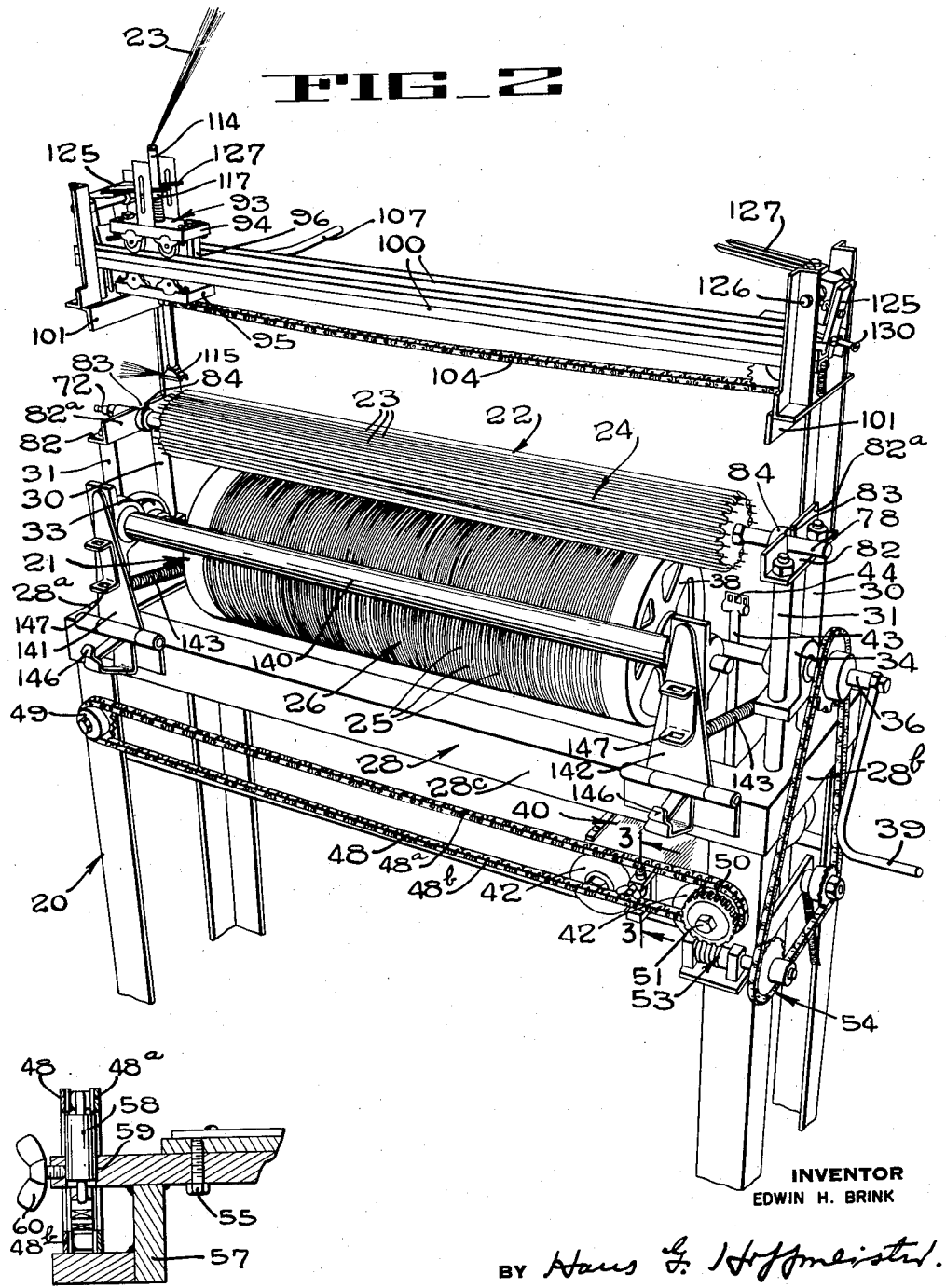

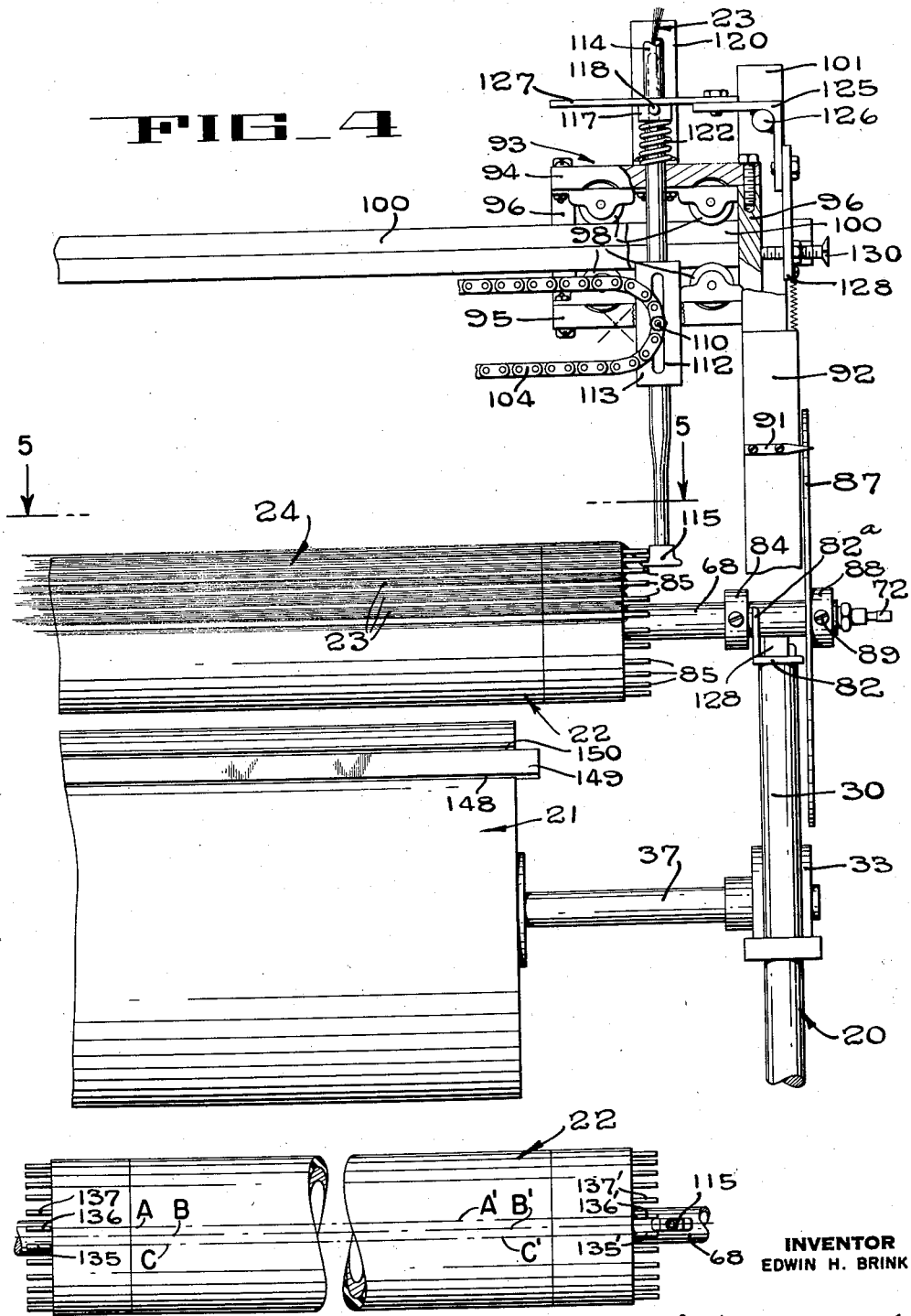
Dec. 2, 1958     E. H. BRINK     2,862,541
METHOD OF AND APPARATUS FOR MAKING FIBER
REINFORCED PLASTIC PIPE
Filed April 19, 1954     4 Sheets-Sheet 3
INVENTOR
EDWIN H. BRINK
BY Hans L. Hoffmeister
ATTORNEY Dec. 2, 1958
E. H. BRINK
2,862,541
METHOD OF AND APPARATUS FOR MAKING FIBER
REINFORCED PLASTIC PIPE
Filed April 19, 1954
4 Sheets-Sheet 4
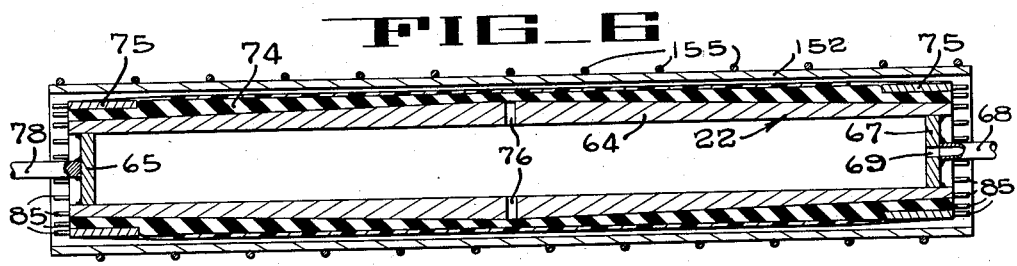
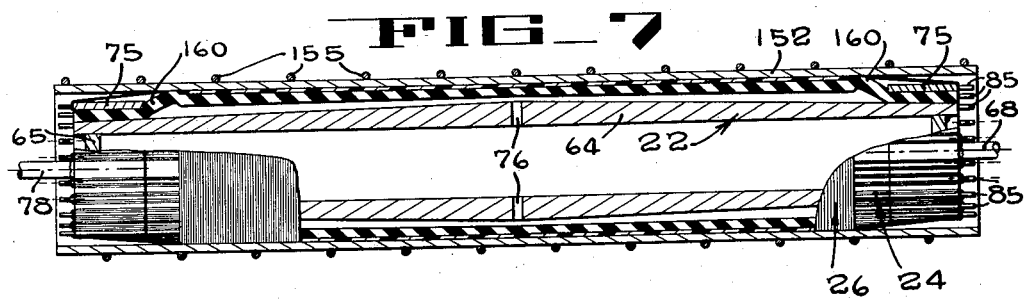
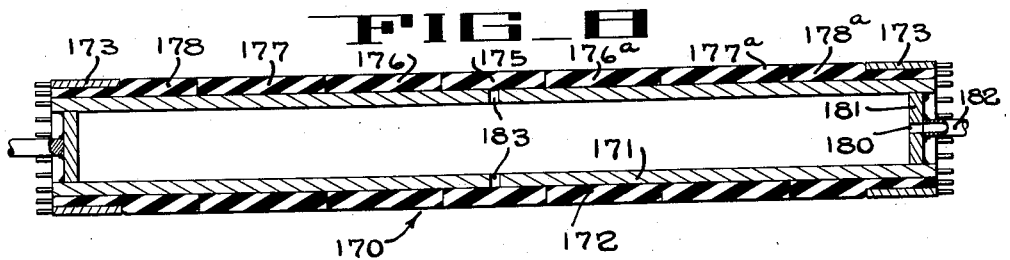
INVENTOR
EDWIN H. BRINK
BY Hans G. Hoffmeister.
ATTORNEY United States Patent Office 2,862,541
Patented Dec. 2, 1958

2,862,541

METHOD OF AND APPARATUS FOR MAKING FIBER REINFORCED PLASTIC PIPE

Edwin H. Brink, San Jose, Calif., assignor to Food Machinery and Chemical Corporation, San Jose, Calif., a corporation of Delaware Application April 19, 1954, Serial No. 423,939

26 Claims. (Cl. 154—1.7)

This invention relates to improvements in methods of making plastic materials and apparatus for carrying out such methods, and more particularly has to do with an improved method of making a tubular pipe from plastic material reinforced by strands of fibrous material.

It is an object of the present invention to provide a novel, efficient process of forming a tubular plastic pipe.

Another object is to provide a novel glass fiber-reinforced plastic pipe which is inexpensive, light in weight and yet durable.

Another object is to provide a plastic pipe having reinforcing fibers molded into the pipe under a predetermined amount of tension.

Another object is to provide means for obtaining a uniform distribution and orientation of fibers in an adhesive binder to form a strong non-porous plastic pipe.

Another object is to provide improved means for efficiently compacting superposed cylindrical layers of resin-impregnated glass fiber material to force entrained air therefrom during the formation of a tubular pipe.

Another object is to provide a novel method of forming a layer of longitudinally disposed fiber strands on a cylindrical mandrel.

Another object is to provide an improved means for impregnating layers of glass fiber material with a curable binder.

Other and further objects and features of the present invention will become apparent from the following description taken in connection with the accompanying drawings, in which:

Fig. 1 is a fragmentary perspective of the pipe forming machine of the present invention.

Fig. 2 is a fragmentary perspective of the same machine, showing the side opposite to that shown in Fig. 1.

Fig. 3 is a fragmentary vertical section taken on line 3—3 of Fig. 2.

Fig. 4 is an enlarged fragmentary elevation of a portion of the machine of Fig. 1, with parts broken away and parts shown in section to more clearly disclose the operating mechanisms.

Fig. 5 is a horizontal section taken on line 5—5 of Fig. 4.

Fig. 6 is a vertical section taken longitudinally through the expandable mandrel used in a preferred embodiment of the machine of the present invention, said mandrel being in unexpanded condition and being disposed inside an electrically heated curing mold.

Fig. 7 is a vertical section, similar to Fig. 6, but showing the mandrel in expanded condition.

Fig. 8 is a vertical section of a modified form of the expandable mandrel of the present invention.

In Figs. 1 and 2 the reference numeral 20 indicates a frame support structure on which two elongated cylindrical mandrels or rollers 21 and 22 are mounted for rotation about parallel horizontal axes. The mandrel 21 is of rigid construction and has a perimeter slightly more than twice as large as the perimeter of the expandable mandrel 22 in expanded condition. Because of its relatively large diameter the mandrel 22 is of the nature of a drum.

In carrying out the method of this invention a strand 23 consisting of a plurality of continuous fibers, such as fibers of glass, is applied longitudinally over the expandable cylindrical mandrel 22 to form a longitudinal layer 24 of fibers, while a similar strand 25 of continuous fibers is wound peripherally on the rigid mandrel or drum 21 to form a helical layer 26. When the longitudinal layer 24 and the helical layer 26 have been formed, they are brought into surface contact and saturated with a suitable binder, such as a thermo-setting resin. The mandrels with layers are then rolled over each other to thoroughly distribute the binder and to force entrained air out of each layer. The helical layer 26 on drum 21 is then cut longitudinally and the entire helical layer is removed from the drum 21 and wound tightly in a peripheral direction around the longitudinal layer 24 on the mandrel 22. Thereafter the expandable mandrel, with the superposed layers of resin-impregnated fibers wound thereon, is inserted in a heated mold and is expanded, by suitable pressure means, to force the layers of fibers into contact with the inner cylindrical wall of the heated mold. After a suitable curing time, the binder is completely cured and the pipe is rigidly consolidated. When the pipe has been rigidified, the mandrel is collapsed, and the mandrel and pipe are removed from the mold. The pipe is then slid endwise off the mandrel.

The support structure 20 (Figs. 1 and 2), on which the drum 21 and the mandrel 22 are rotatably mounted, comprises four vertical legs 27 on the upper surface of which is mounted a U-shaped platform 28 (Fig. 2) having end angle plates 28a and 28b and a rear angle plate 28c. A pair of spaced upstanding rods 30 and 31 are rigidly mounted on the flat upper surface of each end plate. A bearing block 33 is secured above the end plate 28a between the rods 30 and 31 and in alignment with a bearing block 34 which is secured between the rods 30 and 31 above the end plate 28b. The drum 21 is journaled for rotation in the bearing blocks 33 and 34 by means of aligned stub shafts 36 and 37 (Fig., 1), each of which extends through one of the bearing blocks and is keyed to the hub portion of a spider 38 one of which is formed at each end of the hollow drum 21. The drum is rotated by means of a hand crank 39 (Fig. 2) which is keyed to the outer end of the shaft 36.

In the present invention the windings of the helical layer 26 are arranged on the drum 21 in a closely spaced, uniform pattern by means of a carriage 40 (Fig. 1) which is moved back and forth across the support structure 20, in a direction generally parallel to the axis of the drum 21, as the drum is rotated. The carriage 40 has a platform 41 supported on four wheels 42. A post 43 extends upwardly from the platform 41 and carries a spreader head 44 on its upper end at a point adjacent the surface of the drum 21. A guiding eyelet 45 extends from the post 43 in a direction radially away from the drum 21 toward a source of fiber strands (not shown) and is arranged to guide the strand 25 onto the spreader head 44. The wheels of the carriage 40 are grooved and are adapted to roll on two parallel spaced rods 46 which are secured transversely across the frame 20. Traversing movement of the carriage 40 is obtained through an endless chain 48 (Fig. 2) which is trained around sprockets 49 and 50 rotatably mounted on the rear side of the frame 20. The sprocket 50 is keyed to a shaft 51 which is driven by the hand crank 39 through a gear mechanism 53 and a sprocket and chain drive 54. To connect the carriage 40 to the chain 48, the platform 41

(Fig. 3) of the carriage is secured by a capscrew 55 to a connector 57 which has a drive pin 58 that may be selectively engaged with either the upper run 48a or the lower run 48b of the chain, depending upon whether movement of the carriage to the right or to the left is desired. The drive pin 58 is held in selected position in an opening 59 in the connector 57 by a setscrew 60. It will be evident therefore that rotation of the crank 39 will cause simultaneous rotation of the drum 21 and traversing movement of the carriage 40 whereby a helical layer 26 of glass fiber strands may be wound on the drum. Through the correct selection of gears and sprockets, the rotary speed of the drum 21 can be coordinated with the transverse speed of the carriage 40 to form a uniform layer having any desired number of strands per unit of length. In practice, one end of the strand 25 is guided through the eyelet 45 in the spreader head 44 and is tied to a pin 62 (Fig. 1) which projects from the end of the drum. Then, as the carriage is moved laterally and the drum is rotated in the direction of arrow 63, a uniform layer will be formed on the drum.

The expandable mandrel 22 is shown in detail in Fig. 6 and comprises a steel tube 64 which has a maximum outer diameter at the center of its length and tapers toward each end. The tube 64 is sealed at one end by a plate 65 and is provided at the other end with a plate 67 to which an internally threaded nipple 68 is welded. An aperture 69 in the plate 67 communicates with the passage of the nipple 68 so that when an air connection 72 (Fig. 4) is threaded into the nipple, an air hose (not shown) may be used to direct air under pressure into the tube 64. A tubular rubber sleeve 74 (Fig. 6), having an interior configuration conforming to the oppositely slanted outside surfaces of the tube 64 and having a cylindrical exterior surface, is clamped onto the tube 64 in airtight engagement by end rings 75. Radial passages 76 extend through the wall of the tube 64 near the longitudinal center thereof to permit air under pressure in the tube 64 to enter between the tubular rubber sleeve 74 and the outer surface of the tube 64 to inflate the sleeve progressively from the inner thin-walled center portion of the sleeve outwardly towards the relatively thick end portions. As will be expained further hereinafter, the progressive expansion of the rubber sleeve 74 of mandrel 22 prevents the formation of air pockets between the surface of the windings on the mandrel and the heated mold.

The mandrel 22 (Fig. 6) has a stub axle 78 extending outwardly from the end plate 65 in alignment with the axis of the tube 64 and with the nipple 68. The axle 78 and the nipple 68 have the same external diameters and, during the formation of a layer of fiber on the mandrel, the axle and the nipple support the mandrel 22 for rotation about a horizontal axis. For this purpose the axle 78 and the nipple 68 are each held in a recess 83 (Fig. 2) formed in the upstanding flange 82a of an angle bar support member 82 secured between the rods 30 and 31 above each frame end plate. Collars 84 are adjustably secured on the axle 78 and the nipple 68 to prevent axial movement of the mandrel 22.

At each end of the mandrel the longitudinal glass fiber strands are hooked around rigid pins 85 (Fig. 4) which extend axially from each clamping ring 75. These pins are equally spaced and each pin on one end of the mandrel 22 is aligned with a pin on the other end of the mandrel. The mandrel may be angularly indexed by rotating a disc 87 which has a hub 88 secured by a removable setscrew 89 to the outer end of the nipple 68. This disc has calibrations 90 (Fig. 1) on its face which are angularly spaced from each other a distance equal to the angular spacing between pins 85. A pointer 91, projecting outwardly from a vertical extension 92 of the adjacent rod 30, is adapted to be used as a reference point to determine the amount of angular indexing of the mandrel.

The longitudinal layer 24 of glass fiber strands is arranged on the mandrel 22 by means of a shuttle 93 (Fig. 1) which travels back and forth above the longitudinal centerline of the mandrel 22 depositing longitudinal strands in side-by-side relation as the mandrel is angularly indexed until a complete layer has been formed. The shuttle 93 comprises upper and lower platforms 94 and 95, respectively, connected by vertical bars 96. A plurality of wheels 98 (Fig. 4) are rotatably mounted on the platforms and are adapted to ride along a pair of spaced tracks 100 (Fig. 2) which extend transversely of the frame and are secured at each end to angle bar support structures 101 mounted on the vertical extensions 92 of the support rods 30. The shuttle 93 is moved back and forth above the mandrel 22 by means of an endless chain 104 (Fig. 1) which is trained around spaced rotatable sprockets 105 and 106. A crank 107 is connected to a shaft 109 on which the sprocket 105 is keyed. The chain 104 carries a drive pin 110 (Fig. 4) which extends into a vertical slot 112 formed in a plate 113 secured to the shuttle 93. When the crank 107 is turned, the chain 104 is moved and the drive pin 110 urges the shuttle along the transverse tracks 100. When the drive pin 110 is in the upper run of the chain it is disposed near the upper end of the slot 112 and urges the shuttle in one direction, and when the drive pin is in the lower run of the chain it is disposed near the lower end of the slot 112 and urges the shuttle in the opposite direction.

The glass fiber strand 23 is guided downwardly from an elevated supply source (not shown), through a suitable tensioning device, and onto the mandrel 22 by a vertical tube 114 (Fig. 1) which is slidably mounted in bearing apertures in the platforms 94 and 95 of shuttle 93. At its lower end the guide tube carries a spreader head 115. For appropriately guiding the tube 114 during its sliding movement a collar 117 is secured to the tube 114 near its upper end and arms 118 extend outwardly in opposite directions from the collar 117 into guide slots 119 in a pair of spaced upstanding plates 120 mounted on the upper platform 94. A spring 122, disposed between the upper platform 94 and the collar 117, holds the tube 114 in a raised position which is defined by the abutment of a set collar 123 (Fig. 1) on the lower portion of the tube 114 with the bottom surface of the lower platform 95.

The layer 24 of longitudinal strands is formed by carrying the strand transversely of the machine in one direction to deposit one length of the strand longitudinally on the mandrel, hooking the strand around one of the pins 85, and then carrying the strand in the opposite direction to deposit a second length of strand alongside the first. In the present machine the strand is hooked around the pins 85 at each end of the mandrel 22 by means of a bellcrank 125 (Fig. 4) which is pivotally mounted by a pin 126 to the angle bar support structure 101 at each side of the machine. The bellcrank 125 has an arm 127 with a forked outer end disposed in alignment with the guide tube 114, and an arm 128 which extends downwardly into the path of movement of the shuttle 93. Near its lower end, the arm 128 carries a screw 130 which is threaded through the arm and is arranged to be contacted by the shuttle 93. In operation, when the spreader head 115 of the shuttle passes the end of the mandrel 22, one of the vertical bars 96 of the shuttle contacts the screw 130 and causes the bellcrank 125 to pivot on the pin 126, moving the forked arm 127 downwardly to a position straddling the tube 114 and in contact with the set collar 117. As the pivoting movement of the bellcrank is continued, the set collar 117 and the attached tube 114 are moved downwardly to position the spreader head 115 below the adjacent pin 85 so that subsequent manual indexing of the mandrel 22 will cause the strand of fibers to be engaged around the pin 85.

In operation, the shuttle 93 is moved to one end of the tracks 100. A continuous glass fiber strand 23 is drawn from the supply source, threaded down through the guide tube 114, and the end of the strand is tied to one of the pins 85 (Fig. 1) as at 132. As the crank 107 is turned clockwise the shuttle moves toward the right directly above the mandrel 22, depositing a length of fiber strand on the surface of the mandrel. When the shuttle passes the right end of the mandrel, the spreader head 115 is lowered by the bellcrank 125 at that end, bringing the fiber strand into the depressed position shown in Fig. 4. While the spreader head 115 is in this lowered position, the mandrel 22 is indexed by the operator who grasps the disc 87 and rotates it so that the longitudinally aligned pins 136 and 136' (Fig. 5) are moved from position AA' on one side of the path of travel of the head which is indicated by the broken line BB' to position CC' on the other side thereof. Then, when the shuttle which carries the head commences its reverse movement, i. e., moves to the left as viewed in Figs. 4 and 5, the strand 23 will be hooked around the pin 136'. To assure a complete and uniform layer of fibers, it is necessary that the strand 23 passes twice between each pair of pins, as seen in Figs. 1 and 4. Since the first indexing carried the pins 136 and 136' across the line of travel of the spreader head, i. e., line BB', it is necessary that the mandrel be indexed backwardly as the head travels to the left, in order that the strand when reaching the left end of the mandrel will pass a second time between the pins 135 and 136. Then after the head has descended to is depressed position at the left end of the mandrel, the mandrel is indexed forwardly once more in order that the next length of fiber will be laid between pins 136 and 137. This coordinated reversing movement of the shuttle and indexing of the mandrel is continued until the exterior surface of the mandrel is completely covered.

In Fig. 4 the manner in which the mandrel 22 is mounted is indicated. It is to be noted that the nipple 68 of the mandrel is not bottomed in the recess 83 of the angle bar support member 82 but is supported on a spacer bearing block 128 which is inserted between the support member 82 and the nipple 68. The axle 78 is similarly journaled at the opposite side of the machine on a spacer block 128. These blocks hold the peripheral surface of the mandrel 22 spaced above the peripheral surface of the drum 21 during the time that the helical layer of fiber is applied to the drum 21 and during the time the longitudinal layer is applied to mandrel 22. After both layers have been applied, the spacer blocks 128 are withdrawn, permitting the mandrel 22 to drop into contact with the drum 21. The distance between the axis of rotation of the mandrel and the axis of the drum is so chosen that a compression zone is formed between the drum and the mandrel, such that the layers of fibers in the zone are compacted slightly.

In the present machine the layers of fiber are impregnated with a suitable liquid binder by means of an applicator roller 140 (Fig. 2) which is rotatably mounted at the rear of the machine in support arms 141 and 142 pivotally mounted on the support frame 20. Springs 143 are connected between each support arm and the frame and are arranged to swing the roller 140 in a clockwise direction (Fig. 2) to bring it into surface contact with the drum 21. During the application of the binder, the roller 140 is in contact with the drum.

The binder is applied to the layers of fiber strands by pouring a predetermined amount of catalyzed polyester resin, with or without inert fillers, into the nip or trough formed above the contact line of the applicator roller 140 and the drum 21. When the resin is in the trough, the drum is rotated. Due to the frictional interengagement of the helical layer of fiber and the longitudinal layer, rotation of the drum 21 causes rotation of the mandrel 22. The resin is transferred from the helical layer on drum 21 to the longitudinal layer on mandrel 22 and, after a few turns of the mandrel and the drum, the fibers are thoroughly saturated with resin. This roller method of treating the fibers has several advantages over other methods of impregnating the fibers, such as passing them through a dip tank. With the roller method, a controlled amount of resin can be applied; the treating efficiency is relatively unaffected by viscosity changes so that fillers and other ingredients can be added to the resin; and the treated fibers are left relatively free of entrained air; and a definite kneading is exerted by the roller action which serves to thoroughly wet the fibers with resin. All of these factors contribute to the final pipe product being uniform and free of porosity.

After the resin has been applied, the arms 141 and 142, which support the applicator roller 140, may be swung in a counterclockwise direction (Fig. 2), against the resistance of the springs 143, to a retracted position in which each arm is held by a resilient latch member 146 which is mounted on the support frame 20 and is adapted to engage an apertured lug 147 one of which is carried by each pivotal arm.

Following the resin impregnating operation, the helical layer 26 of fibers on drum 21 is cut longitudinally by running a knife or similar cutter along a longitudinal guide groove 148 (Figs. 1 and 4) formed between the longitudinal edge of a guide strip 149 and the side wall of a longitudinal recess 150 in the surface of the drum, in which recess the strip 149 is removably positioned. At each end, the guide strip 149 overhangs the end of the mandrel to facilitate the lifting of the strip 149. After the layer is cut, the strip 149 is raised to lift one severed edge of the helical layer 26 away from the drum 21 and press it against the longitudinal layer on the mandrel 22 where it adheres due to the tackiness of the resin. The transferring of the helical layer is then completed by rotating the mandrel 22, causing it to roll off from the freely rotating drum 21. Since the drum 21 is more than twice as large as the mandrel 22, the helical layer 26 will extend more than twice around the longitudinal layer 24. As will appear presently, it is preferable that the helical layer consist of not more than three windings when an expandable mandrel is used. After the helical layer is in place on the longitudinal layer, the drum 21 is held against rotation and the mandrel is given a few additional turns to tighten the winding and iron out any air pockets formed during the transfer operation.

It is to be particularly noted that, since the layer 26 was wound at least twice around the expandable mandrel, the layer 26 actually assumes a spiral form. Also, since the helical form of the layer as originally wound on the drum 21 has not been eliminated by the transfer of the layer to the mandrel 22, the new layer formed on the mandrel will have the characteristics of a helix as well. Therefore, the new layer has the characteristics of both a helix and a spiral, which contributes to form a uniform, strong pipe wall.

After the superposed layers have been tightly pressed together, the pipe is ready to be cured. The disc 87 is removed from the nipple 68 of the mandrel and the mandrel, with the superposed layers of fiber, is removed from the machine and inserted in a cylindrical mold 152 (Fig. 6). The mold may be heated by any suitable means, as by an electric heating coil 155 wrapped therearound, so that the effective temperature of the mold can be maintained in the range of 225–250° F. An air hose is then applied to the connector 72 and air under pressure is delivered to the inside of the mandrel to expand the rubber sleeve 74 and press the superposed layers of glass fibers into contact with the inner cylindrical surface of the heated mold. It will be noted in Fig. 7 that, at each end of the mandrel 22 between the clamp ring 75 and the last convolution of the helical layer 26, an annular area 160 of the rubber tube 74 is expanded into contact with the inner wall of the mold pressing the terminal portions of the longitudinal strands firmly against said wall. This annular contact area at each end of the mold prevents the liquid resin from being squeezed endwise out of the mold as the mold is expanded. In a typical operation it has been found that an optimum pressure of 90 to 150 p. s. i. on the layers is sufficient to effect complete expansion and maximum density with minimum porosity of the completed pipe. After a curing time of from 5 to 15 minutes, the pipe is completely cured and rigidly consolidated. Other pressures and curing times may be used depending upon the type and amount of materials used in the process.

It is to be particularly noted that the expansion of the mandrel causes the longitudinal fibers of layer 24 to be tensioned since their ends are held in fixed position by the rings 75. Also, the fibers of the helical layer 26 will be tensioned since the layer is expanded at a time when it is no longer free to unwind itself due to the presence of the binder. In this manner the composite pipe is cured while the fibers are in a prestressed or tensioned condition.

After the curing operation the air pressure is released from the mandrel, permitting the rubber sleeve 74 to collapse. With this pressure removed, the mandrel and the pipe can be slid out of the mold by pulling on the end of the mandrel. The longitudinal fibers of the pipe are then cut adjacent the pins 85 at one end of the mandrel, and the pipe is slid off the mandrel by grasping the longitudinal fibers at the other end of the pipe and pulling them away from the pins that they engaged.

To produce a pipe of maximum uniformity by a process using an expandable mandrel it is necessary that the windings be so arranged that they may be expanded uniformly. A continuous spiral winding placed directly on the mandrel would not serve the purpose because such a winding blocks any possibility of expansion. Similarly, it has been found that the helical layers must be limited to a maximum of three or the snubbing action becomes too great and an uneven expansion results with bunching of the helical fiber strands.

In Fig. 8 a modified form of the expandable mandrel of the present invention is shown. In this embodiment, the mandrel 170 comprises a steel tube 171 of uniform wall thickness and constant diameter. A composite rubber sleeve 172 is disposed around the tube 171 with the ends of the sleeve clamped on the tube in airtight engagement by rings 173. The sleeve 172 is made up of a central annular section 175 and symmetrically adjacent sections 176, 176a, 177, 177a, 178 and 178a. The sections are made of rubber materials having different expansion characteristics and they are so arranged that the center section 175 will expand more easily than the sections 176 and 176a, which, in turn, will expand more easily than the sections 177 and 177a. The terminal sections 178 and 178a are the most difficult to expand. In this manner the radial expansion of the sleeve 172 is controlled so that it takes place first at the central section and then longitudinally toward the ends of the mandrel. As previously mentioned, this controlled expansion prevents the trapping of air bubbles between the mold and the windings on the mandrel as the mandrel is expanded. Air under pressure is introduced into the tube 171 through an opening 180 in an end wall 181, said opening 180 being in communication with a nipple 182 welded to the wall 181. Radial passages 183 in the tube 171 direct air to the space between the sleeve 172 and the tube 171.

From the foregoing description it will be apparent that the present invention provides a novel efficient method of making reinforced plastic pipe. The plastic pipe produced by this method is of uniform composition and wall thickness and has sufficient strength to resist considerable bursting and bending pressures.

Although a particular embodiment of the invention has been described in which continuous glass fibers are impregnated with a thermo-setting binder which is subsequently cured by the application of heat, it will be understood that the present novel method can be carried out using a wide variety of fibers and binders. Also, it is evident that the number of individual strands of fibers that make up the "strands" 23 and 25 may vary from a single fiber to a large number of fibers, depending, of course, upon the size of the pipe and the desired speed with which it is formed. While the use of glass in the form of continuous strands provides a material which may be conveniently oriented to resist stresses in predetermined directions, glass in the form of cloth and matting may also be used in the present expandable mandrel process of making plastic pipe. Further, while fibrous glass material possesses many characteristics that are desirable in a plastic material, many other natural and synthetic fibers may be used, such as cotton or nylon fibers. Binders suitable for use with the above mentioned fibrous fabrics may be selected from various materials including thermo-setting and thermo-plastic resinous materials, natural and synthetic rubbers, and pitch substances. It will therefore be apparent that the various physical characteristics of the pipe may be varied according to the present method by the proper selection of suitable fibrous materials and adhesive binders.

In the following claims the term "strand" is used to indicate a single fiber or a group of fibers.

Having thus described my invention, what I claim as new and desire to protect by Letters Patent is:

1. The method of forming a plastic pipe comprising the steps of positioning a layer of strands of fibrous material in a longitudinal pattern on an expandable cylindrical mandrel, winding a continuous strand of fibrous material peripherally around a second cylindrical mandrel to form a second layer, impregnating both layers of fiber strands with a binder, cutting through said second layer along a line generally parallel to the axis of said second mandrel, transferring said second layer from said second mandrel to a position encircling said first layer in a peripheral direction, inserting said expandable cylindrical mandrel with said superposed layers into a curing mold, and expanding said mandrel to press the superposed layers against the inner wall of said mold.

2. The method of forming a plastic pipe comprising the steps of positioning a base layer of longitudinal fiber strands on a first mandrel, positioning a peripherally wound layer of fiber strands over a second mandrel, impregnating the strands of both layers with a liquid binder, cutting through said peripheral layer along a longitudinal line, removing said peripheral layer from said second mandrel and winding it as a unit peripherally around said base layer to form a superposed layer embodying the characteristics of both a helix and a spiral, and curing said binder-impregnated superposed layers.

3. The method of forming a plastic pipe comprising the steps of applying layers of fiber strands to each of two spaced rotatable cylindrical mandrels, moving said mandrels into close parallel relation, applying liquid binder to each layer of fiber strands, cutting the layer of fibers on one mandrel along a line longitudinally of the mandrel, lifting the portion of said severed layer adjacent the longitudinal cut and pressing said portion against the layer of fibers on the other mandrel, rotating said other mandrel to progressively lift the remaining portions of said severed layer from said one mandrel and transferring it to said other mandrel.

4. The method of forming a plastic pipe comprising the steps of applying a layer of strands of fibrous material on each of two vertically spaced parallel cylindrical rotatable mandrels, moving said mandrels into surface contact with each other with the weight of the upper mandrel being applied to press said layers together along the area of contact of said mandrels, applying a curable liquid binder to one of said layers of fiber strands, rotating said mandrels relative to each other to roll said layers over each other to effect transfer of liquid binder between said layers, cutting the layer of fibers on one of said mandrels along a line longitudinally thereof, pressing one edge of said cut layer into contact with the other one of said mandrels, and rotating said mandrels relative to each other to progressively remove the remaining portion of said cut layer from said one mandrel and winding it on said other mandrel as the weight of said upper mandrel presses said layers together.

5. The method of impregnating two layers of fiber strands comprising the steps of applying the layers of fiber strands to each of two spaced parallel rotatable cylindrical mandrels, moving said mandrels into surface contact, applying a liquid binder to the layer of fiber strands on one mandrel, and rotating said mandrels relative to each other to transfer liquid binder from the layer of fibers on said one mandrel to the layer of fibers on the other mandrel.

6. The method of forming a plastic pipe comprising the steps of applying layers of fiber strands to each of two spaced parallel rotatable cylindrical mandrels, moving said mandrels into surface contact, applying a liquid binder to the layer of fiber strands on one mandrel, rotating said mandrels relatively to each other to transfer liquid binder from the layer of fibers on said one mandrel to the layer of fibers on the other mandrel, and transferring one layer of fiber strands from one mandrel to a superposed position over the layer of strands on the other mandrel while maintaining contact between said mandrels.

7. The method of forming a plastic pipe comprising the steps of positioning glass fiber strands longitudinally on a first cylindrical mandrel to form a layer thereon, winding a continuous glass fiber strand in a peripheral direction around a second cylindrical mandrel to form a layer thereon, moving said mandrels into close parallel relation with the layers of fibers thereon in contact with each other, impregnating one of said layers with thermosetting resin, rotating said mandrels to transfer resin from said one impregnated winding to the other winding, cutting the layer on said second mandrel along a line extending longitudinally thereof, removing the layer from said second mandrel and winding it peripherally over the layer on said first mandrel, and subjecting said layers to heat to cure the resin.

8. The method of forming a plastic pipe comprising the steps of positioning fiber strands longitudinally on a rotatable cylindrical mandrel to form a layer thereon, winding a continuous fiber strand helically in a peripheral direction around a second cylindrical mandrel to form a helical layer thereon, moving said mandrels into close parallel relation to define a compression zone between said mandrels adapted to exert a compressing pressure on the strands of fiber passing therethrough, impregnating the windings of each layer of fibers with a curable liquid binder, cutting said helical layer along a line longitudinally of said second cylindrical mandrel, removing said helical layer as a unit from said second mandrel and winding it peripherally on said first mandrel in superposed relation to said longitudinal layer to form a layer embodying the characteristics of both a helix and a spiral, rotating said first mandrel to move said layers through the compression zone between said mandrels whereby to uniformly distribute said liquid binder and force entrained air out of said layers, and subjecting said layers to heat to cure said liquid binder.

9. A pipe forming machine comprising a support structure, a mandrel mounted in said structure for rotation about a fixed substantially horizontal axis, a carriage mounted for reciprocating movement in a direction parallel to said axis, a spreader head supported from said carriage and arranged to guide a strand of fibrous material into close proximity to the surface of said mandrel, means for securing one end of the strand of fibers onto said mandrel, and means for rotating the mandrel and moving said carriage in synchronism to arrange a peripherally wound layer of fibers on said mandrel.

10. A pipe forming machine comprising a rotatable cylindrical mandrel, a plurality of pins extending from each end of the mandrel, each pin being equally spaced from adjacent pins, a shuttle arranged to reciprocate in a path adjacent to and longitudinally of said mandrel and a spreader head carried by said shuttle and adapted to guide a strand of fibrous material onto said mandrel during the reciprocating movement of said shuttle.

11. A pipe forming machine comprising a rotatable cylindrical mandrel, a plurality of pins extending axially from each end of the mandrel in a circular pattern, each pin being equally spaced from adjacent pins, a shuttle arranged to reciprocate in a path above said mandrel and parallel to the longitudinal axis thereof, a spreader head carried by said shuttle and adapted to guide a strand of fibrous material onto said mandrel during the reciprocating movement of said shuttle, and means mounted in the path of movement of said shuttle and operable by the contact of said shuttle thereagainst for depressing said head as the head passes an end of the mandrel to bring the fiber strand carried by the head to a point within the circle defined by said pins.

12. In a pipe forming machine, a support structure, a cylindrical mandrel rotatably mounted in said structure, a plurality of pins extending axially from each end of said mandrel in a circular pattern, a shuttle mounted for reciprocating movement back and forth across said structure longitudinally above said mandrel, a spreader head mounted in said shuttle for vertical sliding movement, said head being arranged to guide a strand of fibrous material onto said mandrel during reciprocating movement of said shuttle, resilient means on said shuttle urging said spreader head into a normal upper position, and an actuating member mounted on said structure adjacent each end of the mandrel, said actuating member including a first arm disposed in the path of movement of said shuttle and arranged to be actuated thereby and a second arm movable in response to actuation of said first arm and arranged to engage said spreader head and move it against the resistance of said resilient means to a depressed position bringing the fiber strand carried by said head to a point below one of said pins, whereby rotary indexing of said mandrel will cause the strand to be hooked around said pin.

13. A pipe forming machine comprising a rotatable cylindrical mandrel, means for forming a layer of fiber material on said mandrel, an elongated cylindrical roller rotatably mounted adjacent said mandrel for rotation about an axis parallel to the axis of rotation of said mandrel, and adjustable from a position radially removed from said mandrel to a position wherein the convex surfaces of said mandrel and said roller are in contact and provide a reservoir for liquid binder directly above the line of contact of said surfaces, and means for rotating said mandrel.

14. A pipe forming machine comprising a rotatable cylindrical mandrel, means for forming a layer of fiber material on said mandrel, an elongated cylindrical roller rotatably mounted adjacent said mandrel for rotation about an axis parallel to the axis of rotation of said mandrel, the convex surfaces of said mandrel and said roller being in contact and providing a reservoir for liquid binder directly above the line of contact of said surfaces, and means for rotating said mandrel and moving a layer of fibers formed on said mandrel through said reservoir.

15. Apparatus for forming a plastic pipe comprising a first and a second cylindrical mandrel, means for forming a peripherally wound layer of fiber on said first mandrel, means for forming a layer of longitudinal fibers on said second mandrel, means for journalling said mandrels for rotation about spaced parallel axes with the layers of fibers on the mandrels abutting each other in frictional driving contact, a longitudinal bar removably mounted on the surface of said first mandrel, means for treating one of said layers of fiber with a liquid binder, and means for rotating said mandrels to transfer liquid binder from said one layer to the other layer and to press a portion of the peripherally wound layer on said first mandrel into adhering contact with said longitudinal bar.

16. A machine for forming plastic pipe comprising a first and a second cylindrical mandrel, means for forming a cylindrical layer of fiber on said first mandrel, means for forming a longitudinal layer on said second mandrel, means journaling said mandrels for rotation about spaced parallel axes with the layers of fibers on the mandrels abutting each other in frictional driving contact, drive means for rotating said mandrels, means for treating the layers of fibers on said mandrels with liquid binder as said mandrels are rotating, and transfer means for transferring said cylindrical layer from said first mandrel to said second mandrel, said transfer means including a transverse lifter bar removably carried by said first mandrel.

17. A machine for forming plastic pipe comprising a first and a second cylindrical mandrel, means for forming a peripherally wound layer thereon of fiber on said first mandrel, means for forming a longitudinal layer of fiber on said second mandrel, means journalling said first mandrel for rotation about a fixed axis, means journalling said second mandrel for rotation about an elevated axis parallel to said fixed axis with the weight of said second mandrel exerting a downward pressure on said first mandrel to press said layers of fiber into frictional driving engagement, means for rotating one of said mandrels to rotate the other mandrel, and means for treating the layers of fibers on said mandrels with liquid binder as said mandrels are rotated.

18. In a machine for forming a pipe, the combination of first and second cylindrical mandrels, selectively adjustable means mounting said mandrels for rotation about parallel axes either in spaced relation to each other or in abutting surface contact, and means for forming layers of fibers on said mandrels.

19. In a machine for forming a pipe, the combination of a first rotatable mandrel, a second rotatable mandrel mounted in spaced relation to said first mandrel, means for forming layers of fibers on said mandrels, and means for transferring the layers of fibers on one mandrel to superposed position around the layers of fibers on the other mandrel.

20. In a machine for forming a pipe, the combination of a first rotatable cylindrical mandrel, a second cylindrical mandrel mounted for rotation on an axis parallel to the axis of rotation of said first mandrel, means for forming a layer of fibers on each of said mandrels, and means for transferring the layers of fibers on said first mandrel from said first mandrel to said second mandrel, said first mandrel being shorter in length and larger in diameter than said second mandrel whereby the transferred layer will extend more than once around said second mandrel and will leave exposed areas of the layer of fibers on said second mandrel at each end thereof.

21. The method of forming a plastic pipe comprising forming on an expandable mandrel a base layer of fibrous material by feeding a fibrous strand onto the mandrel in a reciprocating movement and in a direction longitudinal of the mandrel, treating said base layer with a binder, applying to the base layer a second layer of fibrous material, expanding the mandrel, and curing the binder while the mandrel is in expanded condition.

22. The method of forming a plastic pipe comprising forming on an expandable mandrel a base layer of fibrous material by feeding a fibrous strand onto the mandrel in opposite longitudinal directions with relation to said mandrel, treating said base layer with a liquid binder, applying to the base layer a plurality of layers of fibrous material wherein fibers extend peripherally of the mandrel, expanding the mandrel, and curing the binder while the mandrel is in expanded condition.

23. The method of forming a plastic pipe comprising forming on an expandable mandrel a base layer of fibrous material by feeding a strand of fibers onto the mandrel in a reciprocating movement and in a direction longitudinal of the mandrel, treating said base layer with a liquid binder, applying to the base layer a plurality of layers of fibrous material wherein fibers extend peripherally of the mandrel, enclosing said mandrel and layers in a curing mold, expanding the mandrel, and curing the binder while the mandrel is in expanded condition.

24. The method of forming a layer of longitudinally extending strands on a cylindrical mandrel which has a plurality of axially projecting retaining members disposed in a circular pattern on each end face of the mandrel, said method comprising securing a strand to a first retaining member at one end of said mandrel, laying a first length of said strand longitudinally onto said mandrel, hooking said strand around a second retaining member at the other end of said mandrel, laying a second length of said strand onto the mandrel alongside said first length, hooking said strand around a third retaining member disposed close to said first retaining member, and continuing to lay lengths of the strand onto the mandrel and to hook the strand around successive retaining members at opposite ends of the mandrel to lay adjacent longitudinal lengths of strands entirely around the periphery of said cylindrical mandrel.

25. The method of forming a plastic pipe comprising the steps of disposing a layer of fiber strands on a first mandrel with strands thereof extending longitudinally of the mandrel, disposing a second layer of fiber strands on a second mandrel with strands thereof extending peripherally of the second mandrel, impregnating the strands of both layers with a liquid binder, removing one of said layers from its mandrel and positioning it as a unit peripherally around the other layer to form a superposed layer, and curing the binder with which the layers are impregnated.

26. A machine for forming plastic pipe comprising two cylindrical mandrels, means for forming a layer of fiber on each of said mandrels, means journalling said mandrels for rotation about spaced parallel axes with the layers of fibers on the mandrels abutting each other, means for treating the layers of fibers on said mandrels with liquid binder, and means for rotating the mandrels to distribute the binder throughout the entire extent of both layers.

References Cited in the file of this patent

UNITED STATES PATENTS

| 692,467 | Mugnier | Feb. 4, 1902 |
| 994,748 | Howe | June 13, 1911 |
| 1,504,547 | Egerton | Aug. 12, 1924 |
| 2,213,712 | Marshall | Sept. 3, 1940 |
| 2,422,234 | Goldman | June 17, 1947 |
| 2,467,999 | Stephens | Apr. 19, 1949 |
| 2,478,181 | Coker et al. | Aug. 9, 1949 |
| 2,530,105 | Wallace | Nov. 14, 1950 |
| 2,614,058 | Francis | Oct. 14, 1952 |
| 2,637,674 | Stahl | May 5, 1953 |
| 2,656,873 | Stephens | Oct. 27, 1953 |
| 2,698,458 | Keach | Jan. 4, 1955 |
| 2,718,583 | Noland et al. | Sept. 20, 1955 |
| 2,723,426 | Pelley | Nov. 15, 1955 |
| 2,723,705 | Collins | Nov. 15, 1955 |
| 2,747,616 | De Ganahl | May 29, 1956 |
| 2,747,649 | Reed | May 29, 1956 |